United States Patent
Baxley et al.

(10) Patent No.: US 9,145,772 B2
(45) Date of Patent: Sep. 29, 2015

(54) COMPRESSOR DISK BLEED AIR SCALLOPS

(75) Inventors: Richard C. Baxley, Higganum, CT (US); Christopher St. Mary, Hebron, CT (US); Cagdas Yilmaz, Moodus, CT (US); Gary S. Odell, Haddam Neck, CT (US)

(73) Assignee: United Technologies Corporation, Hartford, CT (US)

( * ) Notice: Subject to any disclaimer, the term of this patent is extended or adjusted under 35 U.S.C. 154(b) by 668 days.

(21) Appl. No.: 13/425,792

(22) Filed: Mar. 21, 2012

(65) Prior Publication Data

US 2013/0195660 A1 Aug. 1, 2013

Related U.S. Application Data

(60) Provisional application No. 61/592,706, filed on Jan. 31, 2012.

(51) Int. Cl.
*F01D 5/02* (2006.01)
*F01D 5/08* (2006.01)
*F01D 25/12* (2006.01)

(52) U.S. Cl.
CPC ............. *F01D 5/082* (2013.01); *F01D 25/12* (2013.01); *Y02T 50/671* (2013.01); *Y02T 50/676* (2013.01); *Y10T 29/4932* (2015.01)

(58) Field of Classification Search
CPC ..... F04D 29/263; F04D 29/266; F01D 5/066; F01D 5/082; F01D 25/12; Y10T 29/4932; Y02T 50/676
USPC ................. 416/93 R, 90 R, 204 R, 198 R
See application file for complete search history.

(56) References Cited

U.S. PATENT DOCUMENTS

| | | | |
|---|---|---|---|
| 2,656,147 A | 10/1953 | Brownhill et al. | |
| 2,657,008 A | 10/1953 | Atkinson | |
| 2,684,831 A | 7/1954 | Grantham | |
| 2,801,792 A | 8/1957 | Lindhagen et al. | |
| 2,858,103 A | 10/1958 | Waugh | |
| 2,910,268 A | 10/1959 | Davies et al. | |
| 3,047,268 A | 7/1962 | Leavitt | |
| 3,730,644 A | 5/1973 | Jubb | |
| 4,231,704 A | 11/1980 | Ayache et al. | |
| 4,940,389 A | 7/1990 | Luxenburger | |
| 5,472,313 A | 12/1995 | Quinones et al. | |
| 5,954,477 A * | 9/1999 | Balsdon .......................... 416/95 |
| 6,283,712 B1 | 9/2001 | Dziech et al. | |

(Continued)

FOREIGN PATENT DOCUMENTS

| DE | 19617539 | | 11/1997 |
|---|---|---|---|
| DE | 19644543 | A1 | 4/1998 |
| EP | 0564135 | B1 | 3/1992 |
| EP | 0487242 | A1 | 5/1992 |

(Continued)

OTHER PUBLICATIONS

International Search Report and Written Opinion, mailed Jan. 16, 2013.

*Primary Examiner* — Dwayne J White
*Assistant Examiner* — Jason Fountain
(74) *Attorney, Agent, or Firm* — Kinney & Lange, P.A.

(57) ABSTRACT

A rotor disk for a gas turbine engine includes a hub; a rim with a forward portion and an aft portion; and a plurality of circumferentially spaced radial scallops in the rim to form cooling slots between two disks when the rotor disk is connected to another rotor disk.

17 Claims, 5 Drawing Sheets

(56) References Cited

U.S. PATENT DOCUMENTS

| | | | |
|---|---|---|---|
| 6,361,277 B1 * | 3/2002 | Bulman et al. | 416/96 R |
| 6,572,337 B1 * | 6/2003 | Herron | 416/198 A |
| 6,749,400 B2 | 6/2004 | Dougherty et al. | |
| 6,857,851 B2 * | 2/2005 | Avignon et al. | 415/116 |
| 7,201,558 B2 | 4/2007 | Norris et al. | |
| 8,727,702 B2 * | 5/2014 | Augustine et al. | 415/115 |
| 2009/0297350 A1 | 12/2009 | Augustine et al. | |
| 2011/0058941 A1 | 3/2011 | Behaghel et al. | |

FOREIGN PATENT DOCUMENTS

| | | |
|---|---|---|
| EP | 0564135 A2 | 10/1993 |
| EP | 0564135 A3 | 10/1993 |
| FR | 2358545 | 2/1978 |
| FR | 2614654 | 11/1988 |
| GB | 801689 | 9/1958 |
| GB | 1277836 | 6/1972 |
| GB | 2084654 | 4/1982 |
| JP | 01225526 A | 5/1989 |
| JP | 04086334 | 3/1992 |

* cited by examiner

COMPRESSOR DISK BLEED AIR SCALLOPS

CROSS-REFERENCE TO RELATED APPLICATION(S)

This application is a nonprovisional application based on U.S. Ser. No. 61/592,706, filed Jan. 31, 2012. All references are incorporated herein.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

The individual compressor and turbine sections in each spool are subdivided into a number of stages, which are formed of alternating rows of rotor blade and stator vane airfoils. The airfoils are shaped to turn, accelerate and compress the working fluid flow, and to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller (turboprop) engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans generate proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between increased core gas path temperatures and pressure ratios, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A rotor disk for a gas turbine engine includes a hub; a rim with a forward portion and an aft portion; and a plurality of circumferentially spaced radial scallops in the rim to form cooling slots between two disks when the rotor disk is connected to another rotor disk. In additional or alternative embodiments, each radial scallop is positioned between two snap segments in the rim; each snap segment comprises a fillet and a radially outward bearing surface to connect to a second rotor disk; each bearing surface connects to a second rotor disk to form cooling slots through the radial scallops and the second rotor disk; and/or each scallop extends from an inner diameter to an outer diameter in the rim of the disk.

A bleed system for a compressor with a plurality of blades includes a first rotor disk with a hub, a plurality of slots to hold the plurality of blades and a rim to connect to a second rotor disk; a plurality of circumferentially spaced snap segments for engaging the second rotor disk; and a plurality of radial scallops in the rim between a pair of snap segments to form cooling slots when the snap segments engage the second rotor disk. In additional or alternative embodiments, each snap segment comprises a fillet and a bearing surface, that the bearing surfaces face radially outward and connect to the second rotor disk, that the connection between the first rotor disk and second rotor disk is an interference fit, that each of the radial scallops extend axially in the forward portion of the rim beyond the snap segments, that the ratio of scallops to blades is 1:2, and/or that the second rotor disk is directly upstream from the first rotor disk.

A method of manufacturing a rotor disk for a gas turbine engine includes forming a first rotor disk with a hub, a plurality of slots to hold a plurality of blades, and a rim with a forward portion and an aft portion, the rim including an axial extending snap ring with a radial wall; and forming a plurality of radial scallops in the rim, extending axially into the snap ring beyond the radial wall to form circumferentially spaced snap segments. In additional or alternative embodiments, the method includes machining out parts of the forward portion of the rim, forming each snap segment with a fillet and a bearing surface facing radially outward; forming a plurality of radial scallops in the forward portion of the rim; and/or forming scallops so that the ratio of scallops to blades is 1:2.

DETAILED DESCRIPTION

Figure 1:
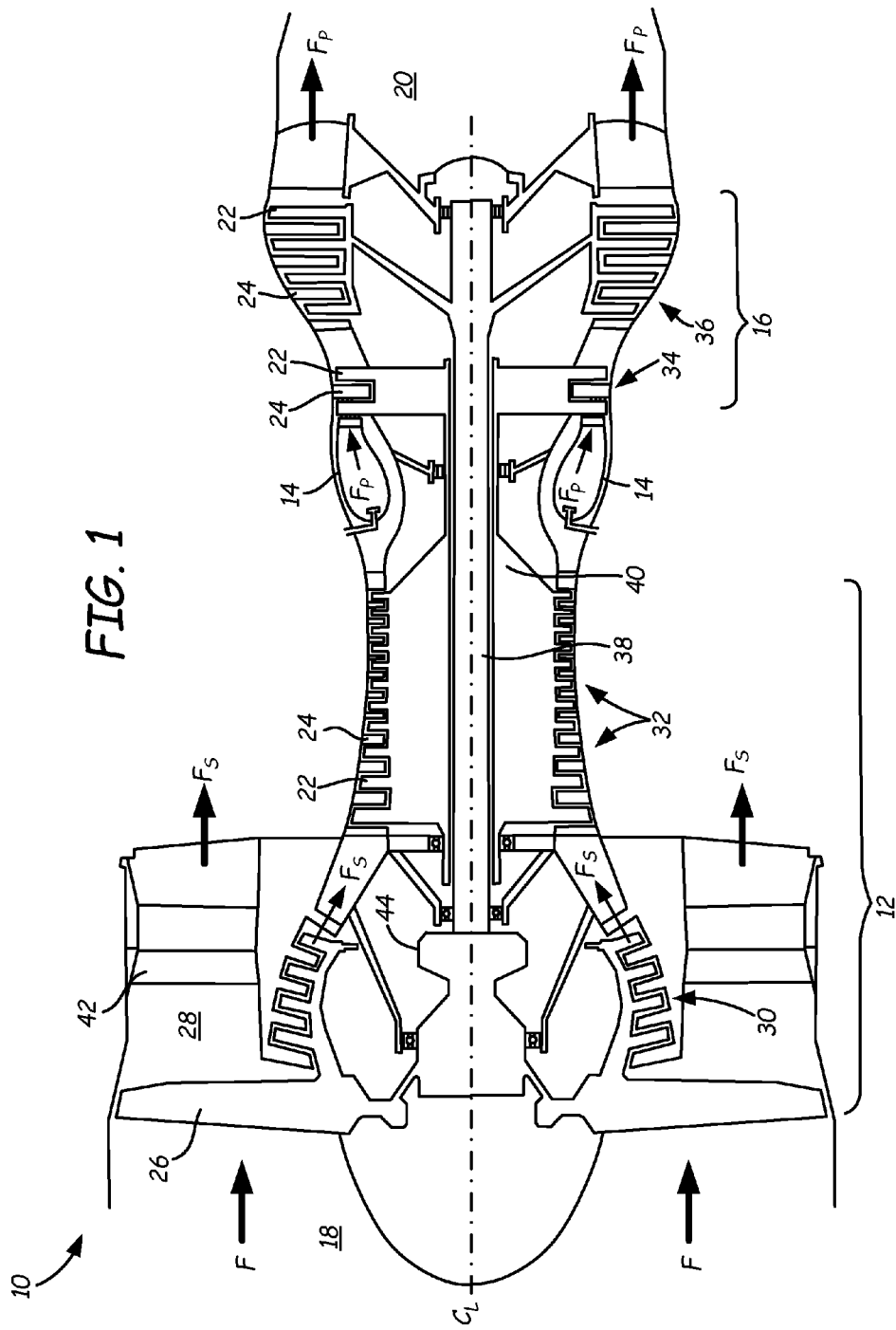
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for this cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, and fan exit guide vanes (FEGVs) 42 reduce swirl to improve thrust performance. In some designs, structural guide vanes (SGVs) 42 are used, offering combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop engines, high or low bypass turbofan engines, turboshaft engines and turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but not limited to, cooled gas turbine engine components in compressor sections 30 and 32, combustor 14, turbine sections 34 and 36, and exhaust section 20 of gas turbine engine 10.

Figure 2A:
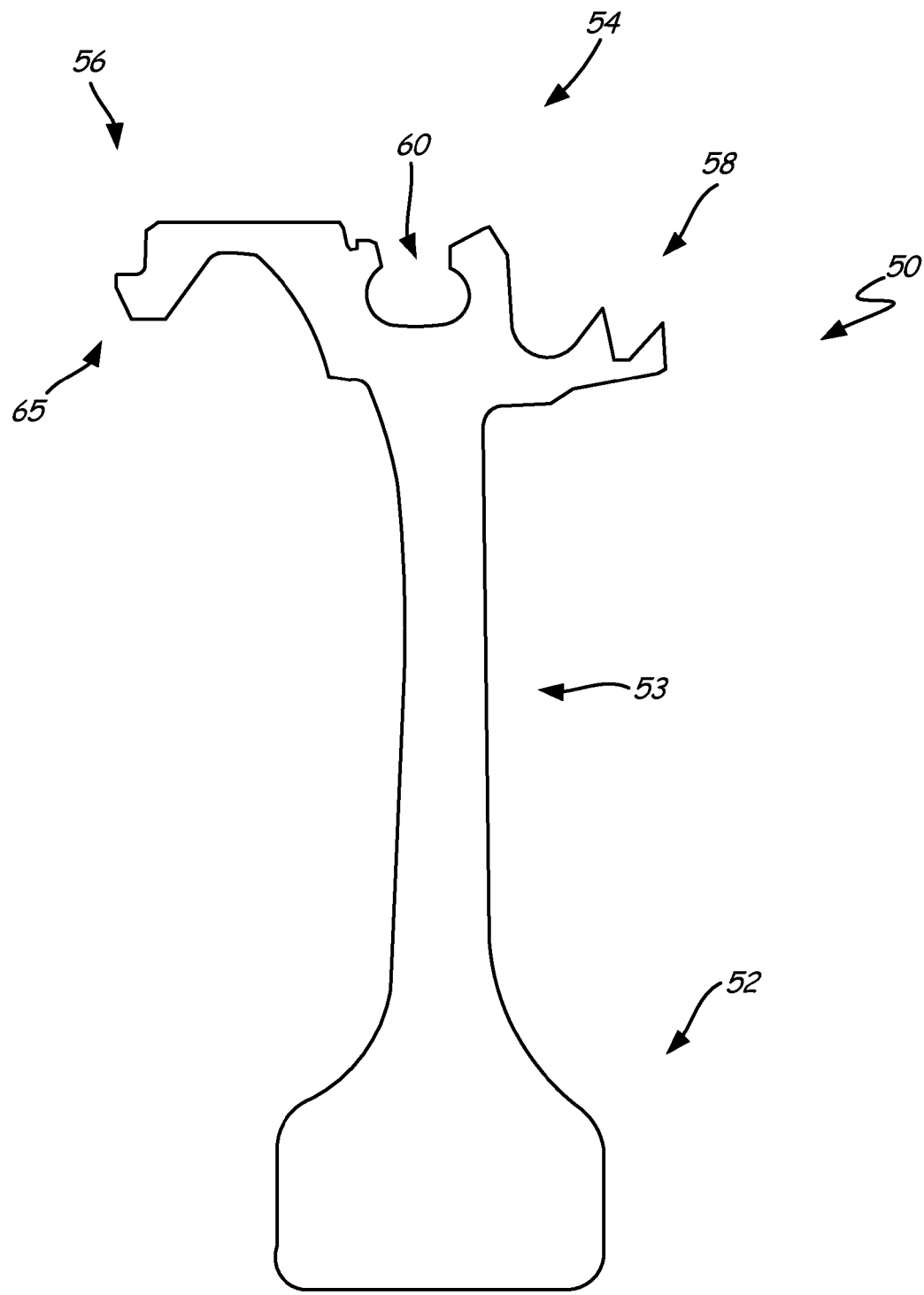
FIG. 2A is cross-sectional view of a compressor rotor disk.
Figure 2B:
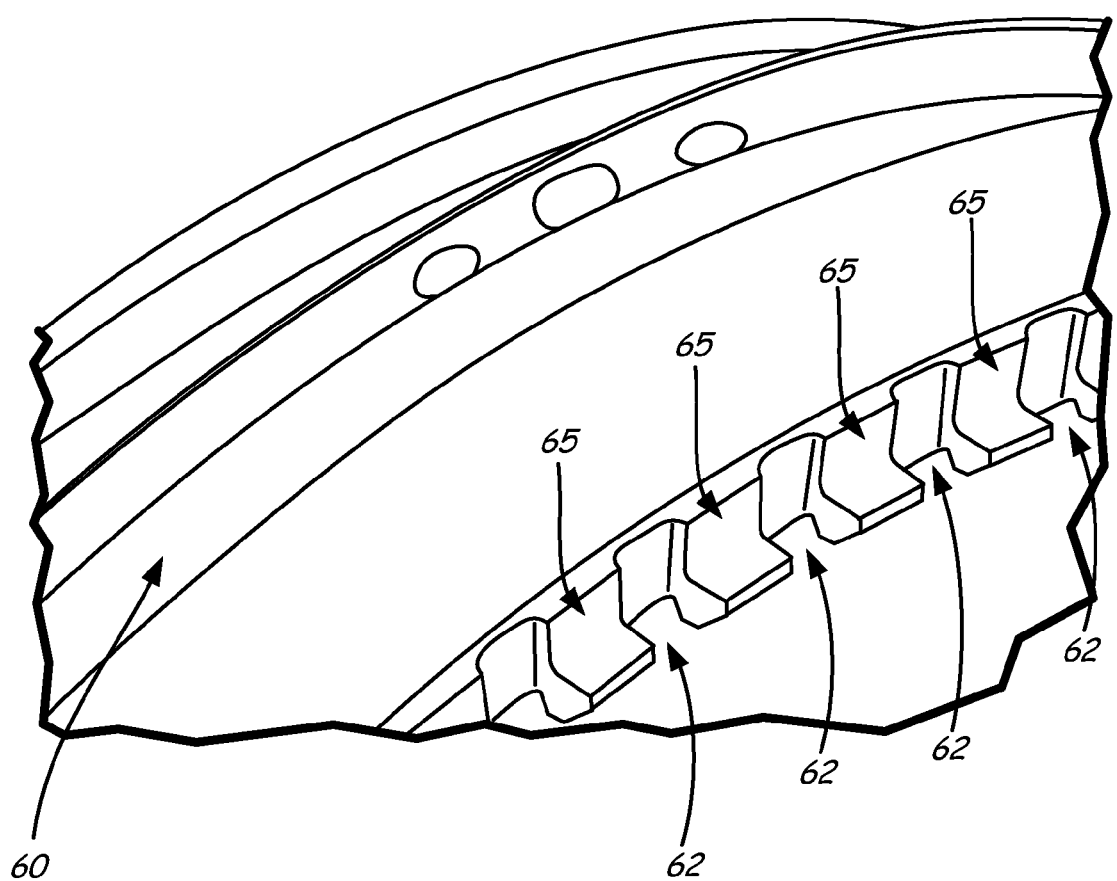
FIG. 2B is a perspective view of portion of the compressor rotor disk of FIG. 2A.

FIG. 2A is a cross-sectional of compressor rotor disk 50, and FIG. 2B is a perspective view of a forward rim portion of the compressor rotor disk 50. FIGS. 2A-2B include hub 52, web 53 and rim 54 with forward portion 56, aft portion 58, slot 60, scallops 62, snap segments 65 and fillets 70. Disk 50 is one integral part and connects to other compressor rotor disks (see FIG. 3) to form a compressor section in a gas turbine engine.

Typical disks include a rim with a snap, a tightly dimensioned diameter of a hoop which stacks a disk onto an adjacent disk in a compressor. Disk 50 includes an interrupted snap, with a plurality of scallops 62 cut into rim 54 of disk 50, extending axially beyond snap segments 65. Snap segments 65 can be equally spaced around the circumference of rim 54. Snap segments 65 connect to an upstream disk, and scallops 62 are sized and formed into disk 50 to allow air to pass between the disks when connected, as upstream disk connects to radially facing wall of snap segment 65 (see FIG. 4), and scallops 62 extend axially aft from that. The number and size of scallops 62 can be in relation to the amount of flow required, the size of rotor disk 50, the number of slots to hold blades in disk 50, stress in fillets 70 and other considerations. In one example, the ratio of scallops 62 to blades in disk 50 is 1:2.

Figure 3A:
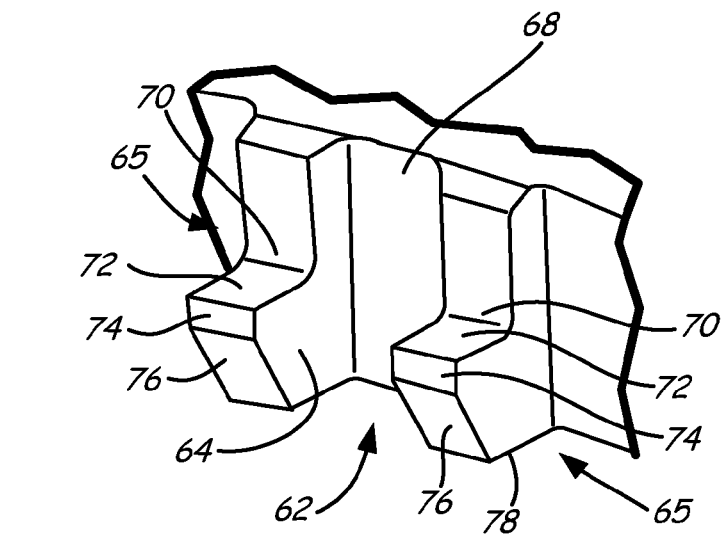
FIG. 3A shows a cross-sectional view of section 2 of the rotor disk of FIG. 1.
Figure 3B:
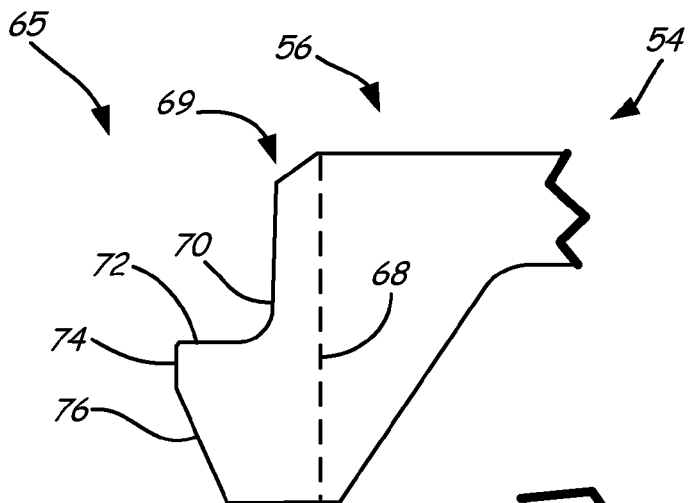
FIG. 3B shows a perspective view of FIG. 2A.
Figure 3C:
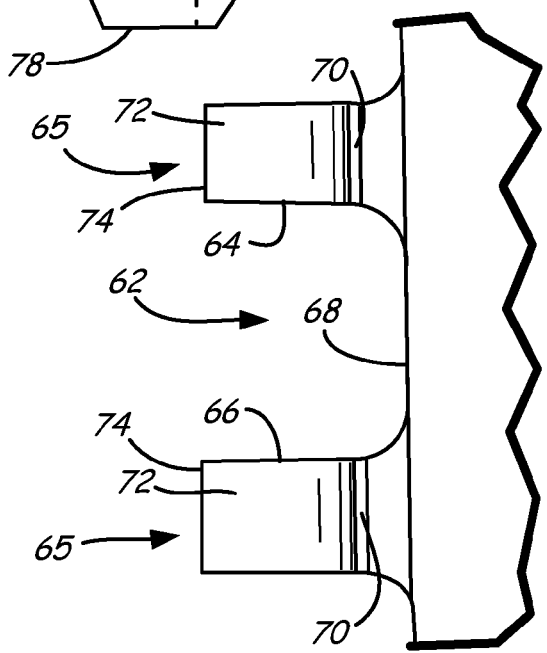
FIG. 3C shows a top view FIG. 2A.

FIG. 3A shows a perspective view of a forward portion 56 of rim 54, as FIG. 3B shows a cross-sectional view of FIG. 3A, and FIG. 3C shows a top view FIG. 3A. FIGS. 3A-3C include forward portion 56 of rim 54, scallop 62 with side walls 64, 66 and back wall 68, and snap segments 65 with chamfer 69, fillets 70, bearing surfaces 72, front face 74, bevel 76 and bottom 78.

Scallop 62 is defined by side walls 64, 66 back wall 68. Side walls 64, 66 back wall 68 are radially outward from engine center line $C_L$ (see FIG. 1) in forward portion 56 of rim 54. Back wall 68 extends axially into disk 50 beyond snap segments 65 to allow air flow when disk 50 is connected to another disk.

Figure 4:
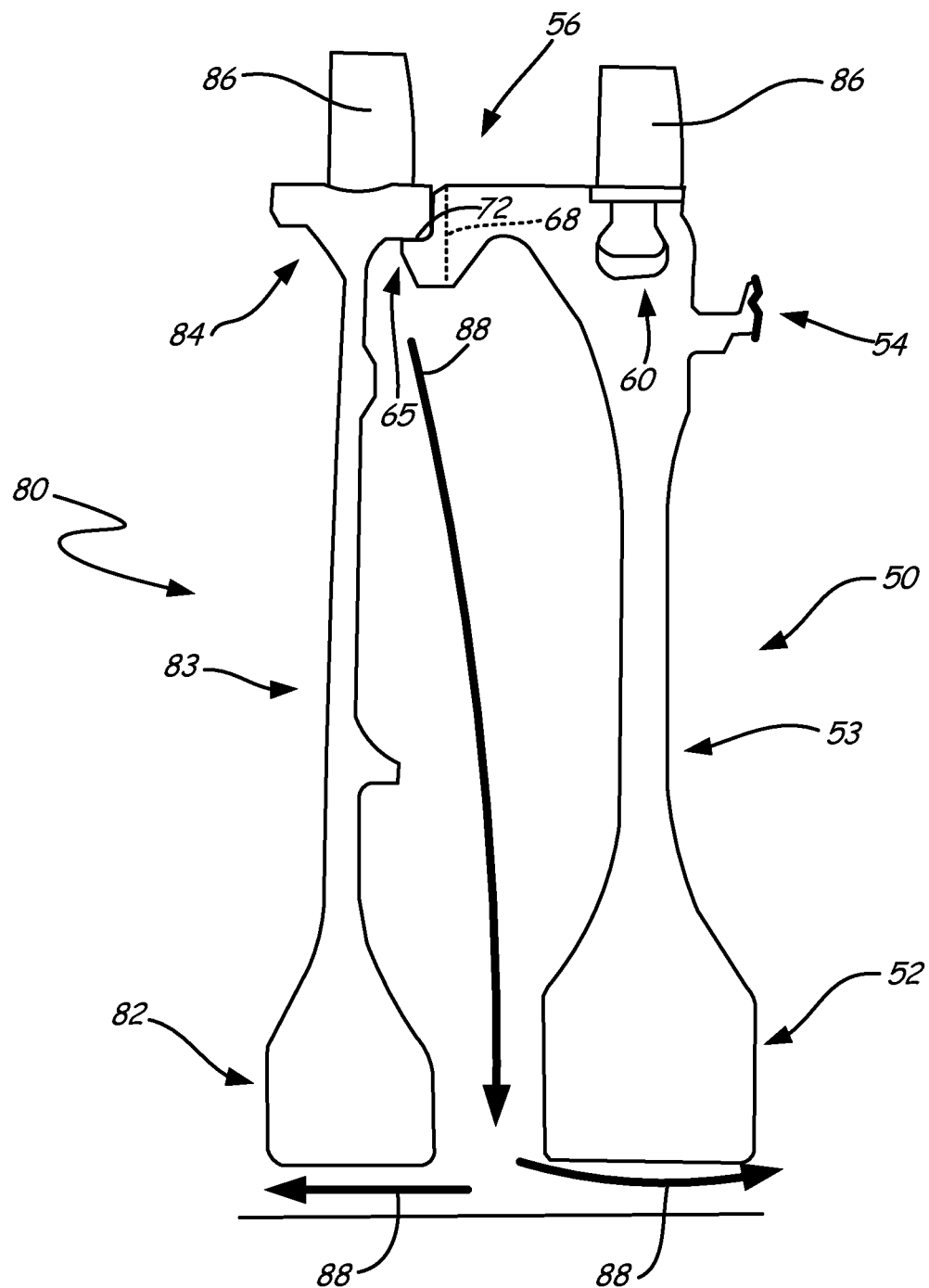
FIG. 4 shows a cross-sectional view of the seventh and eighth stage disks of a compressor.

Bearing surfaces 72 of snap segments 65 face radially outward to connect to an aft portion of a second rotor disk (see FIG. 4). This connection can be through an interference fit, which can be formed by heating one disk and cooling the other disk. Bearing surfaces 72 must carry the circumferential load or hoop stress in compressor disks 50, so snap segments 65 (including fillets 70, front face 74, bevel 76 and bottom 78) are sized and designed in accordance with the load requirements related to a particular engine as well as the desired scallop size for cooling flow.

Scallops 62 are located in forward portion 56 of rim 54 to allow bleed air to pass from the compressor section of the engine between two disks to cool downstream hot turbine airfoils. Forming radial scallops 62 in forward portion 56 of rim 54, provides air passageways that allow bleed air to pass through while still retaining the bearing capability needed to support the geometry of rotor disk 50. For example, scallops 62 can be machined with a grinding wheel when loaded on a machine to form rotor disk 50. Snap segments 65 with fillets 70 and bearing surfaces 72 are sized to maximize bearing area and minimize stress concentration increases.

FIG. 4 shows a cross-sectional view of upstream and downstream disks in a compressor incorporating to current invention. This example embodiment shows includes eighth stage rotor disk 50 with hub 52, web 53 and rim 54 (with forward portion 56, aft portion 58 and slot 60), seventh stage rotor disk 80 with hub 82, web 83, rim 84, blades 86 and arrows 88 showing cooling air flow. Forward portion 56 of eight stage disk 50 includes snap segments 65 with bearing surface 72 and dashed line designating back wall 68 of scallop 62.

Seventh stage disk 80 and eight stage rotor disk 50 can fit together with an interference fit. This can be done, for example, by heating seventh stage disk 80 and cooling eighth stage disk 50, connecting them at bearing surfaces 72 of snap segments 65, and then allowing disks 50 and 80 to return to room temperature. When they return to room temperatures, disk 50 expands and disk 80 contracts, so that they are held tightly together on bearing surfaces and do not rotate in relation to each other. They can also be held together with a tie rod (not shown)

Radial scallops 62, defined by snap segments 65 with fillets 70 and bearing surfaces 72, allow air to pass between disks 50 and 80, bringing cooling air flow 88 to high temperature turbine parts. Scallops 62 are easy to manufacture through conventional milling processes in forward rim of disk 50, and provide passages to allow the cooling air required while maintaining the strength and bearing capacity required of disk 50. Snap segments 65 with chamfers 69, fillets 70, bearing surfaces 72, front face 74, bevel 76 and bottom 78 are formed to be light-weight while also providing the necessary mass and surface area for bearing surfaces 72 to carry required loads while minimizing stress concentrations. The ability easily manufacture rotor disk 50 with scallops 62 also results in economic benefits over bleed holes or other alternatives which are more difficult to manufacture.

While the invention has been shown to include scallops 62 in the forward portion of rim 54, this is for example purposes only, and scallops could be in aft portion of rim. Additionally, while discussion has been in relation to bladed rotors in the seventh and eighth stage of the compressor, this is for example purposes only and could be varied according to system requirements. For example, scallops 62 could be formed on an integrally bladed rotor or on other stages of a compressor, turbine or other system which could benefit from radial cooling scallops between rotor disks.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rotor disk for a gas turbine engine, the disk comprising:
   a hub;
   a rim with a forward portion and an aft portion;
   a web extending between the hub and the rim;
   a plurality of snap segments in the rim, wherein each snap segment has a radially outward bearing surface that is configured to abut a rim of an adjacent rotor disk; and
   a plurality of circumferentially spaced radial scallops in the rim.

2. The rotor disk of claim 1, wherein each radial scallop of the plurality of circumferentially spaced radial scallops is positioned between two snap segments in the rim.

3. The rotor disk of claim 2, wherein each snap segment further comprises a fillet, and wherein the bearing surface is configured to form an interference fit with the adjacent rotor disk.

4. The rotor disk of claim 3, wherein each bearing surface connects to the adjacent rotor disk to form cooling slots through the radial scallops and the adjacent rotor disk.

5. The rotor disk of claim 1, wherein each scallop extends from an inner diameter to an outer diameter in the rim of the disk.

6. A bleed system for a compressor with a plurality of blades, the system comprising:
   a first rotor disk with a hub, a rim, a web extending between the hub and the rim, and a plurality of slots to hold the plurality of blades;
   a second rotor disk with a hub, a rim, and a web extending between the hub and the rim;

a plurality of circumferentially spaced snap segments in the rim of the first rotor disk, wherein each snap segment has a bearing surface that abuts the rim of the second rotor disk; and a plurality of radial scallops in the rim of the first rotor disk between a pair of snap segments to form cooling slots between the first rotor disk and the second rotor disk.

7. The system of claim 6, wherein each snap segment further comprises a fillet.

8. The system of claim 7, wherein the bearing surfaces facing radially outward to connect to the second rotor disk.

9. The system of claim 8, wherein the connection between the first rotor disk and the second rotor disk is an interference fit.

10. The system of claim 6, wherein each of the radial scallops extend axially into a forward portion of the rim beyond the snap segments.

11. The system of claim 6, wherein a ratio of scallops to blades is 1:2.

12. The system of claim 6, wherein the second rotor disk is directly upstream of the first rotor disk.

13. A method of manufacturing a rotor disk for a gas turbine engine, the method comprising:

forming a first rotor disk with a hub, a plurality of slots to hold a plurality of blades, and a rim with a forward portion and an aft portion, the forward portion including an axial extending snap ring with a radial wall, wherein the snap ring is configured to abut a rim of a second rotor disk; and forming a plurality of radial scallops in the rim of the first rotor disk, extending axially into the snap ring beyond the radial wall to form circumferentially spaced snap segments, wherein each snap segment has a bearing surface that abuts the rim of the second rotor disk.

14. The method of claim 13, wherein the step of forming a plurality of radial scallops in the rim comprises:

machining out parts of the forward portion of the rim.

15. The method of claim 14, wherein each snap segment further comprises a fillet, and wherein the bearing surface faces radially outward.

16. The method of claim 13, wherein the step of forming a plurality of radial scallops in the rim comprises:

forming a plurality of radial scallops in a forward portion of the rim.

17. The method of claim 13, wherein a ratio of scallops to blades is 1:2.

* * * * *